United States Patent [19]
Terrell et al.

[11] Patent Number: 5,918,724
[45] Date of Patent: Jul. 6, 1999

[54] LOW INERTIA ARTICLE-DIVERTER BLADE

[75] Inventors: Jonathan Dean Terrell; Edward Ydoate, both of Louisville, Ky.

[73] Assignee: Sandvik Sorting Systems, Inc., Louisville, Ky.

[21] Appl. No.: 09/001,187

[22] Filed: Dec. 30, 1997

[51] Int. Cl.$^6$ ........................................ B65G 37/00
[52] U.S. Cl. ............................ 198/367; 198/370.07
[58] Field of Search ........................ 198/367, 370.07, 198/342, 598, 599, 636, 637

[56] References Cited

U.S. PATENT DOCUMENTS

| | | | |
|---|---|---|---|
| 2,465,690 | 3/1949 | Lyon | 198/367 |
| 2,670,835 | 3/1954 | Huttmann | 198/367 |
| 4,298,117 | 11/1981 | Kobayashi et al. | 198/599 |
| 5,029,692 | 7/1991 | Warkentin | 198/365 |

*Primary Examiner*—Joseph E. Valenza
*Assistant Examiner*—Joe Dillon, Jr.
*Attorney, Agent, or Firm*—Burns, Doane, Swecker & Mathis, L.L.P.

[57] ABSTRACT

A diverter blade for displacing articles from a conveying surface includes a motor-driven, torque-transmitting metallic section, and a plastic section integrally molded to the metallic section. Portions of the metallic section are embedded within the plastic section to reinforce the plastic section and transmit torque thereto. The plastic section forms an article-contacting front wall, and includes diagonal reinforcing braces on a rear side of the front wall.

12 Claims, 3 Drawing Sheets

LOW INERTIA ARTICLE-DIVERTER BLADE

BACKGROUND OF THE INVENTION

The present invention relates to a diverter blade for diverting articles from a conveying surface.

In the conveying and sorting of packages, such as packages to be mailed, it is customary, as shown in FIG. 6, to divert the packages A from a conveying surface 2 at respective discharge stations. On flat belt sorters this has traditionally been done using a steel diverter blade 4 which is rotated by a suitable actuator 6 into contact with a package to physically displace the package onto a branch conveyor or chute 8.

Steel diverter blades have been susceptible to fatigue failure, especially due to cracks which initiate in the heat-affected weld zones. Applicants have determined that such cracks occur as a result of the cyclical dynamic loads generated by accelerating and decelerating the blade.

It is necessary to grind and reweld, or replace a cracked diverter blade, which is expensive and requires that the conveyor line be temporarily shut down.

It would be desirable to provide a novel diverter blade which is highly resistant to such fatigue failure.

SUMMARY OF THE INVENTION

The present invention relates to a diverter blade adapted to be rotated to displace articles from a conveying surface. The blade comprises a metallic section, and a plastic section. The metallic section is adapted to be connected to a drive motor for transmitting torque therefrom. The metallic section includes a rotary mounting portion defining an axis of rotation, and at least one torque-transmitting member projecting from the mounting portion at an angle relative to an axis. The plastic section is molded of a plastic material integrally with the metallic section to envelop the torque-transmitting member. The plastic section includes an article-contacting front wall.

The invention also relates to a conveying mechanism including such diverter blades.

BRIEF DESCRIPTION OF THE DRAWINGS

The objects and advantages of the invention will become apparent from the following detailed description of preferred embodiments thereof in connection with the accompanying drawing in which like numerals designate like elements and in which.

DETAILED DESCRIPTION OF A PREFERRED EMBODIMENT OF THE INVENTION

A diverter blade 10 according to the present invention comprises a metallic section 12 and a plastic section 14 that is integrally molded to the metallic section.

Figure 1:
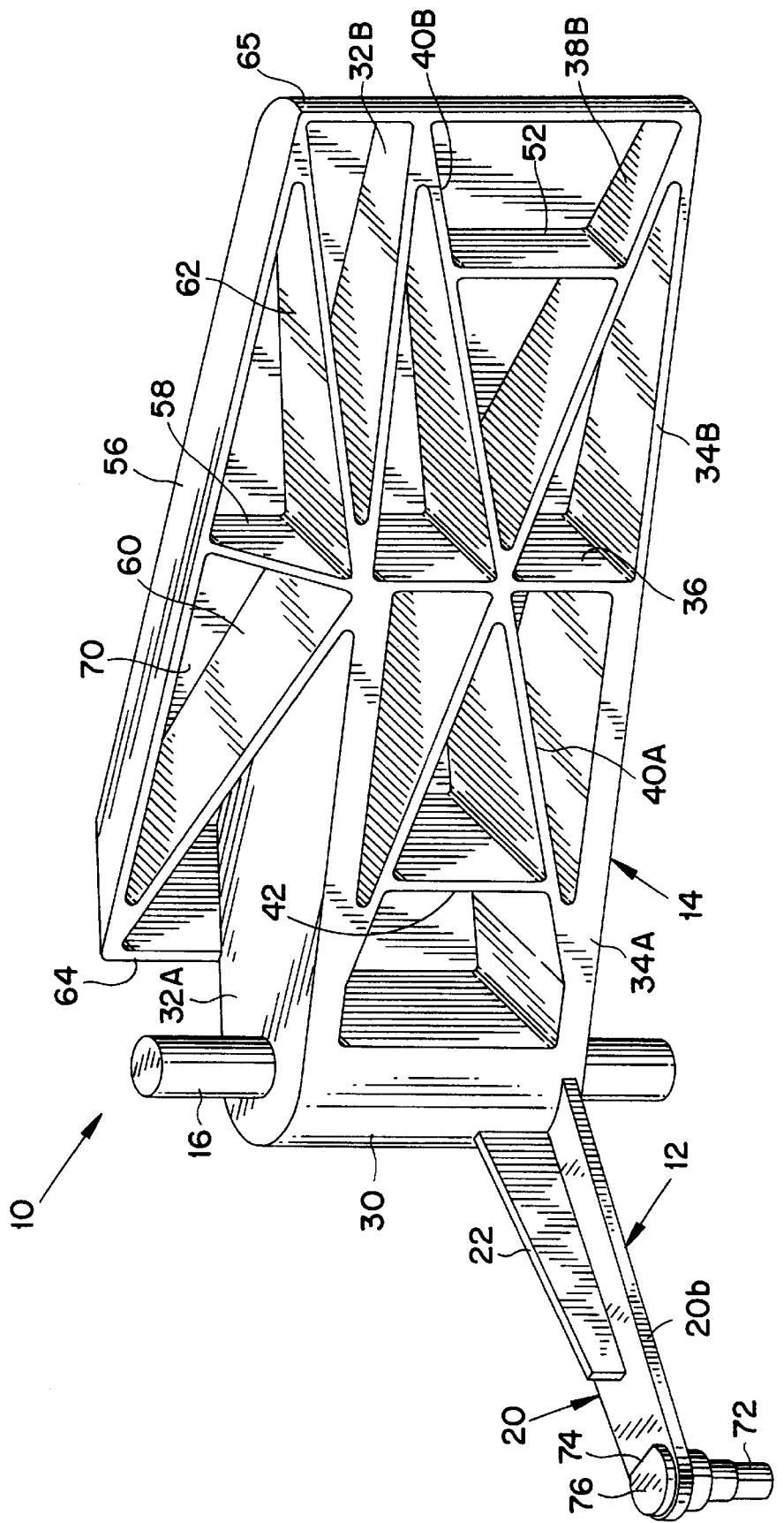
FIG. 1 is a rear perspective view of a diverter blade according to the present invention.
Figure 2:
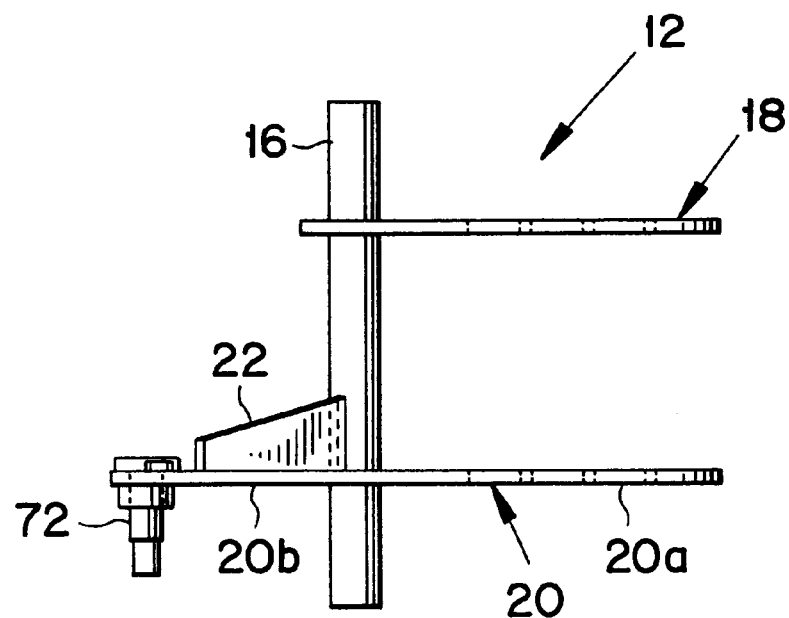
FIG. 2 is a side elevational view of a metallic section of the blade depicted in FIG. 1.
Figure 3:
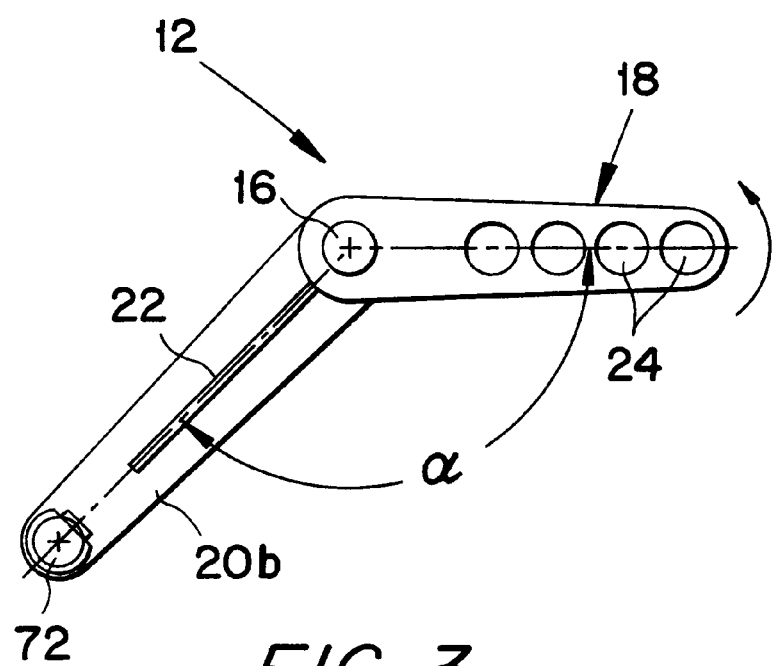
FIG. 3 is a top plan view of the metallic section depicted in FIG. 2.
Figure 4:
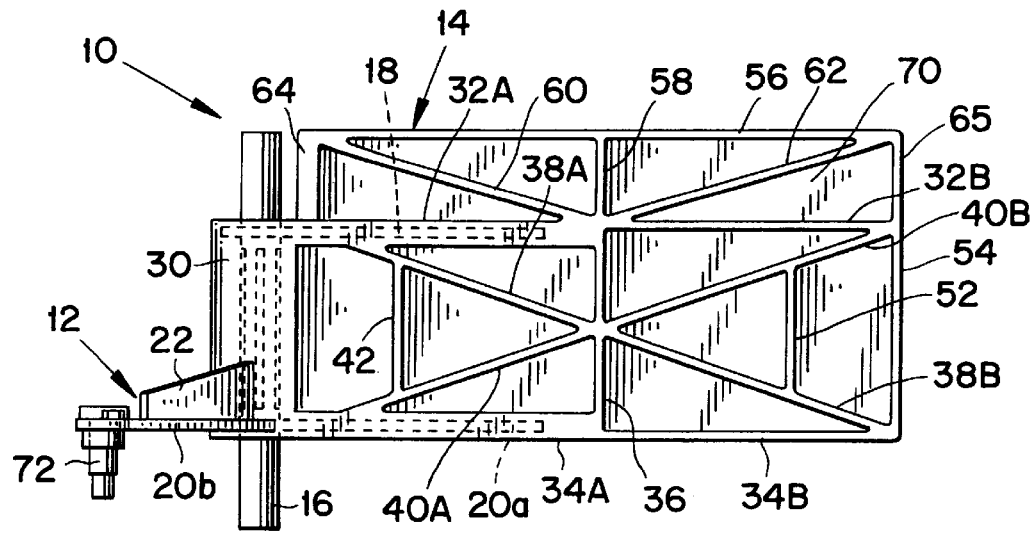
FIG. 4 is a rear elevational view of the blade depicted in FIG. 1.

As depicted in FIGS. 2 and 3, the metallic section 12, which is formed preferably of carbon steel, comprises a vertical cylindrical shaft 16, a pair of parallel plates 18, 20 spaced apart vertically in a longitudinal direction of the shaft 16, and a gusset 22 welded to an upper surface of the lower plate 20. The lower plate 20 includes a first portion 20a situated directly beneath the upper plate 18, and a second portion 20b extending to an opposite side of the shaft and to which the gusset 22 is attached. The plate portions 20a, 20b form an obtuse angle α (e.g., 135°) between one another.

The plates 18, 20 are attached to the shaft 16 by welding, and the gusset 22 is welded to the second portion 20b of the lower plate 20. The upper plate 18, and the first portion 20a of the lower plate 20 include vertical through-holes 24.

After being fabricated, the metallic section 12 is placed in a mold (not shown) and a plastic material, preferably a polymer such as a polyurethane is injected thereinto to form the plastic section 14 in integral relationship with the metallic section 12. That is, the plastic material completely encompasses the upper plate 18, the first portion 20a of the lower plate 20, and part of the shaft 16. The plastic section 14 is thus of one-piece integral construction and includes a vertical mounting portion 30 encompassing a portion of the shaft 16, and a pair of parallel upper and lower main arms 32A, 34A extending horizontally from the mounting portion 30. The upper plate 18 is embedded in, and reinforces, the upper arm 32A, and the first portion 20a of the lower plate 20 is embedded in, and reinforces, the lower arm 34A. The plastic material of the upper and lower arms 32, 34 flows through the through-holes 24 of those plates to anchor the arms to the plates by means of an interference-fit.

Outer free ends of the upper and lower arms are interconnected by a vertical gusset 36. Diagonal braces 38A, 40A interconnect the gusset 36 with the main arms 32A and 34A, respectively. A vertical gusset 42 interconnects the diagonal braces 38A, 40A.

Extending horizontally outward from the gusset 36 in alignment with the main arms 32A, 34A are upper and lower secondary arms 32B, 34B. Diagonal braces 40B and 38B are extensions of 40A and 38A, which interconnect with the outer face ends of secondary arms 32B, 34B, respectively. A vertical gusset 52 interconnects the diagonal braces 40B, 38B, and a vertical wall 54 interconnects free ends of the secondary arms 32B, 34B.

The article-contacting surface 70 extends above forward positions of the main and secondary arms 32A, 32B. Horizontal member 56 is located along the top edge of surface 70. A vertical gusset 58 aligned with vertical gusset 36, connects a central position of the top member 56 with the upper arms 32A, 32B. A pair of diagonal braces 60, 62 interconnects outer ends of the top member 56 with the upper arms 32A, 32B. Vertical walls 64, 65 interconnect the ends of the top member 56 with the upper main arm 32A and secondary arm 32B, respectively.

Extending across a front side of the plastic portion 14 is a front article-contacting wall 70. That article-contacting wall 70 extends vertically from the top member 56 to the lower main and secondary arms 34A, 34B and extends horizontally from the vertical wall 64 and mounting portion 30 to the vertical walls 65, 54.

In use, the diverter blade 10 is mounted by positioning the upper and lower ends of the shaft 16 in respective bearings (not shown). Thus, the shaft 16 constitutes a rotary mounting portion defining an axis of rotation. The blade is attached to a drive motor in any suitable manner. Preferably, a free end of the second portion 20b of the lower plate 20 includes a hole in which a pin 72 is mounted. The shaft 16 would be mounted for rotation in suitable bearings (not shown), and the lower end of the pin 72 could be attached to any suitable motor (not shown) which rotates the diverter about the axis of the shaft 16 in a direction D (FIG. 5) for bringing the article-contacting surface 70 of the blade into engagement with an article A in order to physically displace the article. The torque applied to the metallic section 12 is transmitted to the plastic section 14 by the upper plate 18 and the first portion 20a of the lower plate 20.

During that rotation, the pattern of diagonal braces 38A, 38B, 40A, 40B, 60 and 62 extending across the back of the contact wall 70 stiffen the blade torsionally. All horizontal, vertical and diagonal braces reinforce the article-contact surface 70, against impact from the packages.

Figure 5:
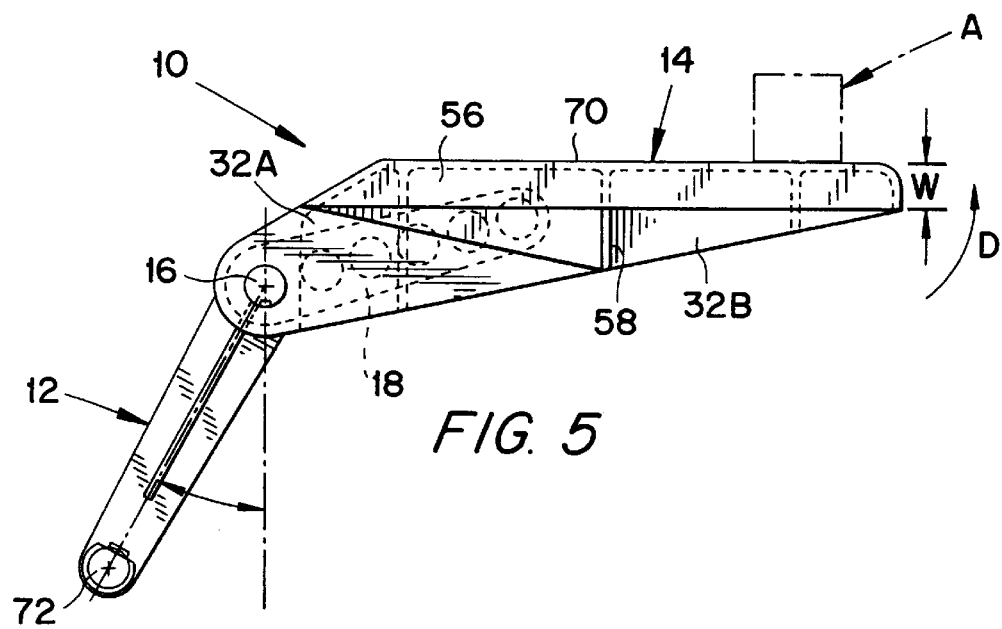
FIG. 5 is a top plan view of the blade depicted in FIG. 1.
Figure 6:
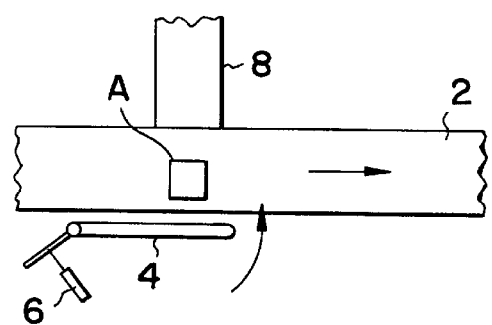
FIG. 6 is a schematic top plan view of a conventional article conveying arrangement employing a rotary diverter blade.

As is apparent from FIG. 5, the width W of the plastic section tapers-down from the region of the shaft 16 to the outer free end of the blade. Thus, the plastic part 14 is stronger adjacent the shaft 16 where the torque is applied, and the free end of the blade is of less weight in order to minimize the mass (and resulting inertia) of the blade 10.

It will be appreciated that the center of gravity of the blade is located nearer the axis of rotation. The resulting inertia of the polyurethane blade that occurs during rotary acceleration and deceleration is significantly less than the inertia of similar metal blades. Thus, the dynamic loads encountered within the blade are lessened, thereby reducing the susceptibility of the blade to fatigue cracks. Furthermore, the elastomeric material provides a greater resistance to fatigue than steel.

Although the present invention has been described in connection with a preferred embodiment thereof, it will be appreciated by those skilled in the art that additions, deletions, modification, and substitutions not specifically described may be made without departing from the spirit and scope of the invention as defined in the appended claims.

What is claimed is:

1. A diverter blade adapted to be rotated to displace articles from a conveying surface, comprising:
   a metallic section adapted to be connected to a drive motor for transmitting torque therefrom, the metallic section including a rotary mounting portion defining a rotary axis, and at least one torque-transmitting member projecting from the mounting portion at angle relative to the axis; and
   a plastic section molded of a plastic material integrally with the metallic section to envelop the torque transmitting member, the plastic section including an article-contacting front wall.

2. The diverter blade according to claim 1 wherein the mounting portion of the metallic section comprises a shaft, a portion of the shaft disposed between opposite ends thereof being encompassed by the plastic section.

3. The diverter blade according to claim 1 wherein the torque-transmitting member includes through-holes in which the plastic material is disposed to interlock the torque-transmitting member to the plastic section by an interference-fit.

4. The diverter blade according to claim 1 wherein the plastic section includes a width dimension which gradually tapers-down toward a free end of the plastic section situated remotely of the rotary axis.

5. The diverter blade according to claim 1 wherein the plastic section includes diagonal reinforcing members.

6. The diverter blade according to claim 1 wherein the plastic section is formed of a polymer.

7. The diverter blade according to claim 1 wherein the metallic section includes a plurality of the torque-transmitting members extending parallel to one another; the plastic section enveloping at least one of the torque-transmitting members.

8. The diverter blade according to claim 7 wherein one of the torque-transmitting members has first and second portions extending in different directions from the shaft, the first section embedded in the plastic section, and the second portion being exposed and including a connector adapted for attachment to a drive motor.

9. The diverter blade according to claim 1 wherein the metallic section is formed of carbon steel.

10. The diverter blade according to claim 6 wherein the polymer is polyurethane.

11. A diverter blade adapted to be rotated to displace articles from a conveying surface, comprising:
    a metallic section adapted to be connected to a drive motor for transmitting torque therefrom, the metallic section including a rotary shaft defining an axis of rotation, and a plurality of torque-transmitting members extending perpendicularly from the shaft and parallel to one another; and
    a plastic section molded of a plastic material integrally with the metallic section to envelop the torque-transmitting members and a portion of the shaft situated between opposite ends of the shaft, the plastic section including an article-contacting front wall and diagonal braces disposed on a rear surface of the front wall, the plastic section including a width dimension which gradually tapers-down toward a free end of the plastic section situated remotely of the rotary axis.

12. A conveying mechanism comprising:
    a conveyor having an upwardly facing conveying surface for conveying articles to respective discharge stations;
    diverter blades disposed at respective discharge stations for contacting and transferring the articles to the discharge stations, each diverter blade comprising:
        a metallic section including a rotary mounting portion mounted for rotation about a rotary axis, at least one torque-transmitting member projecting from the mounting portion at an angle relative to the axis, and a motor-connecting member projecting perpendicularly from the mounting portion, and
        a plastic section molded of a plastic material integrally with the metallic section to envelop the torque-transmitting member, the plastic section including an article-contacting front wall; and
        a motor connected to the motor-connecting member for rotating the metallic section about the axis, whereby the rotation is transmitted to the plastic section by the torque-transmitting member.

* * * * *